United States Patent
Park et al.

(10) Patent No.: US 10,292,234 B2
(45) Date of Patent: May 14, 2019

(54) AC ELECTROLUMINESCENCE DEVICE AND FINGER SCAN SENSOR PLATFORM USING THE SAME

(71) Applicant: UNIVERSITY-INDUSTRY FOUNDATION (UIF), YONSEI UNIVERSITY, Seoul (KR)

(72) Inventors: Cheolmin Park, Seoul (KR); Sung Hwan Cho, Seoul (KR); Eui Hyuk Kim, Seoul (KR)

(73) Assignee: UIVERSITY-INDUSTRY FOUNDATION (UIF), YONSEI UNIVERSITY, Seoul (KR)

(*) Notice: Subject to any disclaimer, the term of this patent is extended or adjusted under 35 U.S.C. 154(b) by 0 days.

(21) Appl. No.: 15/608,348

(22) Filed: May 30, 2017

(65) Prior Publication Data

US 2017/0354016 A1    Dec. 7, 2017

(30) Foreign Application Priority Data

Jun. 1, 2016   (KR) .................. 10-2016-0068094

(51) Int. Cl.
| | |
|---|---|
| G06K 9/00 | (2006.01) |
| H05B 33/14 | (2006.01) |
| H05B 33/20 | (2006.01) |
| H05B 33/22 | (2006.01) |
| H05B 33/26 | (2006.01) |

(52) U.S. Cl.
CPC .......... *H05B 33/22* (2013.01); *G06K 9/0004* (2013.01); *G06K 9/00006* (2013.01); *H05B 33/14* (2013.01); *H05B 33/20* (2013.01); *H05B 33/26* (2013.01)

(58) Field of Classification Search
USPC ........................................... 428/917
See application file for complete search history.

(56) References Cited

U.S. PATENT DOCUMENTS

| | | | |
|---|---|---|---|
| 2004/0252867 A1* | 12/2004 | Lan ............. | G06K 9/0004 |
| | | | 382/124 |
| 2005/0140286 A1* | 6/2005 | Ito ............. | H01L 27/32 |
| | | | 313/506 |

(Continued)

FOREIGN PATENT DOCUMENTS

| | | | |
|---|---|---|---|
| KR | 10-2003-0017095 | | 3/2003 |
| KR | 10-2016-0048642 | | 5/2016 |
| WO | WO 2016-064222 | * | 4/2016 |

*Primary Examiner* — Ashok Patel

(57) ABSTRACT

Provided are an AC electroluminescence device includes a bottom electrode including a first electrode and a second electrode apart from each other, wherein AC power is applied between the first electrode and the second electrode; an electron injecting layer disposed on the bottom electrode; an emission layer disposed on the electron injecting layer; a dielectric layer disposed on the emission layer; a top electrode, which is disposed on the dielectric layer and includes a first portion opposing the first electrode and a second portion opposing the second electrode; a first emission region defined by a first overlapping region of the emission layer between the first portion of the top electrode and the first electrode of the bottom electrode; and a second emission region defined by a second overlapping region of the emission layer between the second portion of the top electrode and the second electrode of the bottom electrode.

12 Claims, 11 Drawing Sheets

(56) References Cited

U.S. PATENT DOCUMENTS

2008/0309234 A1* 12/2008 Cho .................... H05B 33/145
313/509
2014/0353657 A1* 12/2014 Hayashi ............. H01L 51/5203
257/40

* cited by examiner

100B

AC ELECTROLUMINESCENCE DEVICE AND FINGER SCAN SENSOR PLATFORM USING THE SAME

CROSS-REFERENCE TO RELATED APPLICATION

This application claims priority of Korean Patent Application No. 10-2016-0068094, filed on Jun. 1, 2016, in the KIPO (Korean Intellectual Property Office), the disclosure of which is incorporated herein entirely by reference.

BACKGROUND OF THE INVENTION

Field of the Invention

The present disclosure relates to an AC electroluminescence device, and more particularly, to an AC electroluminescence device having an inverted structure and a fingerprint recognizing sensor platform using the same.

Description of the Related Art

Future man-centered human information systems include various information devices and systems for safety and convenient life for social activities of individuals including health and security. In particular, sensing technology for efficiently detecting human biological information and motion is an essential technique for man-machine interface. Electronic devices based on organic materials, and more particularly, polymers are known for easy application to a human body due to their excellent mechanical flexibility. Furthermore, highly sensitive organic electronic device-based sensors for implementing a man-machine interface technology under development include organic thin-film transistor (OTFT) and organic light-emitting diode (OLED).

However, since most of conventional OLED sensors are not self-sensing devices, the conventional OLED devices require sensor films for actual sensing. Electro-luminescence (EL) emitted from an OLED is used as a light source of inducing photoluminescence (PL) at a sensor film. In this case, the overall device structure becomes complicated, and manufacturing cost thereof is increased due to the use of an expensive sensing film.

Therefore, it may be necessary to develop a functional sensor having a new principle and a new structure in order to develop a highly integrated device exhibiting a low manufacturing cost and a simple structure. To resolve this problem, it may be required to develop an AC electroluminescence device having a new driving principle and a new driving mechanism.

SUMMARY OF THE INVENTION

Provided is an AC electroluminescence device having a new principle and a new structure for developing a highly integrated AC electroluminescence device with low manufacturing cost and a simple structure.

Provided is a fingerprint recognizing sensor platform having the above-stated advantages.

Additional aspects will be set forth in part in the description which follows and, in part, will be apparent from the description, or may be learned by practice of the presented embodiments.

According to an aspect of an embodiment, an AC electroluminescence device including a bottom electrode including a first electrode and a second electrode apart from each other, wherein AC power is applied between the first electrode and the second electrode; an electron injecting layer disposed over the bottom electrode; an emission layer disposed over the electron injecting layer; a dielectric layer disposed over the emission layer; a top electrode, which is disposed over the dielectric layer and includes a first portion facing the first electrode and a second portion facing the second electrode; a first emission region defined by a first overlapping region of the emission layer between the first portion of the top electrode and the first electrode of the bottom electrode; and a second emission region defined by a second overlapping region of the emission layer between the second portion of the top electrode and the second electrode of the bottom electrode.

According to an embodiment, the top electrode may electrically interconnect the first overlapping region of the first electrode and the second overlapping region of the second electrode in a structure in which the bottom electrode, the electron injecting layer, the emission layer, and the dielectric layer are stacked. During a first half-period, an electric field may be formed toward the second electrode of the bottom electrode, the top electrode, and the first electrode of the bottom electrode, and, during a second half-period, an electric field may be formed toward the first electrode of the bottom electrode, the top electrode, and the second electrode of the bottom electrode.

According to an embodiment, light emission of the first emission region and light emission of the second emission region may occur alternately. The first electrode may be a transparent electrode formed of any one of indium tin oxide (ITO), indium zinc oxide (IZO), carbon nanotube (CNT) graphene, silver (Ag) nano wire, a metal mesh, and hybrid metal embedded. Furthermore, the top electrode may be a conductive external object.

According to an embodiment, the electron injecting layer may include at least one of materials including a composite material (ZnO:PEI) of polyethylenimine (PEI) and zinc oxide (ZnO), Alq3 (tris(8-hydroxyquinoline) aluminum), Balq (Bis(2-methyl-8-quinolinolate)-4-(phenylphenolato) aluminium: Balq), Bebq2 (bis(10-hydroxybenzo [h] quinolinato)-beryllium: Bebq2), BCP (2,9-dimethyl-4,7-diphenyl-1,10-phenanthroline), Bphen (4,7-diphenyl-1,10-phenanthroline), TPBI ((2,2',2"-(benzene-1,3,5-triyl)-tris(1-phenyl-1H-benzimidazole), TAZ (3-(4-biphenyl)-4-phenyl-5-tert-butylphenyl-1,2,4-triazole), NTAZ (4-(naphthalen-1-yl)-3,5-diphenyl-4H-1,2,4-triazole), NBphen (2,9-bis(naphthalen-2-yl)-4,7-diphenyl-1,10-phenanthroline), 3TPYMB (Tris(2,4,6-trimethyl-3-(pyridin-3-yl)phenyl)borane: 3TPYMB), POPy2 (Phenyl-dipyrenylphosphine oxide), BP4mPy (3,3',5,5'-tetra[(m-pyridyl)-phen-3-yl]biphenyl), TmPyPB (1,3,5-tri[(3-pyridyl)-phen-3-yl]benzene), BmPyPhB (1,3-bis[3,5-di(pyridin-3-yl)phenyl]benzene), Bepq2 (Bis(10-hydroxybenzo[h]quinolinato) beryllium), DPPS (Diphenylbis(4-(pyridin-3-yl)phenyl)silane), TpPyPB (1,3,5-tri(p-pyrid-3-yl-phenyl)benzene), Bpy-OXD (1,3-bis[2-(2,2'-bipyridine-6-yl)-1,3,4-oxadiazo-5-yl]benzene), BP-OXD-Bpy (6,6'-bis[5-(biphenyl-4-yl)-1,3,4-oxadiazo-2-yl]-2,2'-bipyridyl), tBu-PBD (2-(4-Biphenylyl)-5-(4-tert-butylphenyl)-1,3,4-oxadiazole), and ADN (9,10-di(naphthalene-2-yl) anthrascene).

According to another embodiment, the AC electroluminescence device may further include a hole injecting layer disposed between the emission layer and the dielectric layer. The hole injecting layer may include at least one of materials including PEDOT/PSS (Poly(3,4-ethylenedioxythiophene)/Poly(4-styrenesulfonate)), a phthalocyanine compound, DNTPD (N,N'-diphenyl-N,N'-bis-[4-(phenyl-m-tolylamino)-phenyl]-biphenyl-4,4'-diamine), m-MTDATA (4,4', 4''-tris(3-methylphenylphenylamino)triphenylamine), TDATA (4,4'4''-Tris(N,N-diphenylamino)triphenylamine), 2T-NATA (4,4',4''-tris{N,-(2-naphthyl)-N-phenylamino}-triphenylamine), α-NPD (N,N'-bis(naphthalen-1-yl)-N,N'-bis(phenyl)-2,2'-dimethylbenzidine), PANI/DBSA (Polyaniline/Dodecylbenzenesulfonic acid), PANI/CSA (Polyaniline/Camphor sulfonicacid), PANI/PSS (Polyaniline)/Poly(4-styrenesulfonate), N,N'-di(naphthalene-1-yl)-N,N'-diphenyl-benzidine (NPB), poly(N-vinylcarbazole) (PVK), poly(4-vinyltriphenylamine) (PVTTA), poly[N-(4-{N'-[4-(4-diphenylamino)phenyl]phenyl-N'-phenylamino}phenyl)methacrylamide] (PTPDMA), and poly[N,N'-bis(4-butylphenyl)-N,N'-bis(phenyl)benzidine (Poly-TPD).

According to an aspect of another embodiment, an AC electroluminescence device having a stacked structure includes a bottom electrode; an electron injecting layer disposed over the bottom electrode; an emission layer disposed over the electron injecting layer; and a dielectric layer disposed over the emission layer; wherein a conductive external object approaching to or contacting the dielectric layer is electrically connected to the emission layer via the dielectric layer and function as a top electrode.

According to an embodiment, the bottom electrode includes a first electrode and a second electrode apart from each other, and AC power may be applied between the first electrode and the second electrode. Alternatively, in the stacked structure, AC power may be applied between the bottom electrode and the dielectric layer. The conductive external object may be either a finger of a user or a stylus pen. The emission layer may emit light according to the pattern of a touch input applied to the top of the dielectric layer.

According to an aspect of another embodiment, a fingerprint recognizing sensor platform includes an AC electroluminescence device having an inverted structure; a light receiving sensor, which detects light via the AC electroluminescence device having an inverted structure; and a processor, which performs fingerprint recognition based on light detected by the light receiving sensor. The AC electroluminescence device having an inverted structure includes a bottom electrode including a first electrode and a second electrode apart from each other, wherein AC power is applied between the first electrode and the second electrode; an electron injecting layer disposed over the bottom electrode; an emission layer disposed over the electron injecting layer; a dielectric layer disposed over the emission layer; a top electrode, which is disposed over the dielectric layer and includes a first portion facing the first electrode and a second portion facing the second electrode; a first emission region defined by a first overlapping region of the emission layer between the first portion of the top electrode and the first electrode of the bottom electrode; and a second emission region defined by a second overlapping region of the emission layer between the second portion of the top electrode and the second electrode of the bottom electrode.

According to another embodiment, the top electrode may electrically interconnect the first overlapping region of the first electrode and the second overlapping region of the second electrode in a structure in which the bottom electrode 10, the electron injecting layer 20, the emission layer 30, and the dielectric layer 50 are stacked. During a first half-period, an electric field may be formed toward the second electrode of the bottom electrode, the top electrode, and the first electrode of the bottom electrode, and, during a second half-period, an electric field may be formed toward the first electrode of the bottom electrode, the top electrode, and the second electrode of the bottom electrode. Light emission of the first emission region and light emission of the second emission region may occur alternately.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1A:
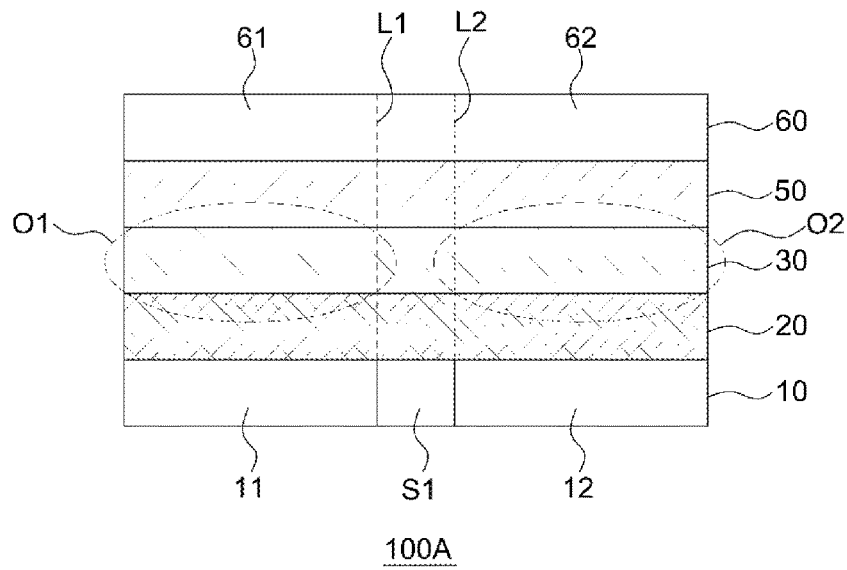
FIGS. 1A and 1B are a cross-sectional view and a perspective view of an AC electroluminescence device according to an embodiment of the present invention, respectively.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

In this specification, the term "touch input pattern" defines a fingerprint of a touched finger of a user or a character input by using a pen. In this specification, the term "inverse structure" means that in a stacked structure of an AC electroluminescence device, a dielectric layer is disposed on a lower of a top electrode, not on an upper of a bottom electrode, and an electron injecting layer for injecting electrons is disposed on an upper of the bottom electrode, and a hole injecting layer is disposed between and emission layer and the dielectric layer for improved light emission efficiency. Also, in this specification, the term "transparent" is not to be construed as having transparency with respect to all of domains of wavelengths corresponding to visible rays, infrared ray, or ultraviolet ray and should be interpreted as having transparency in some wavelength bands of these domains.

Figure 1B:
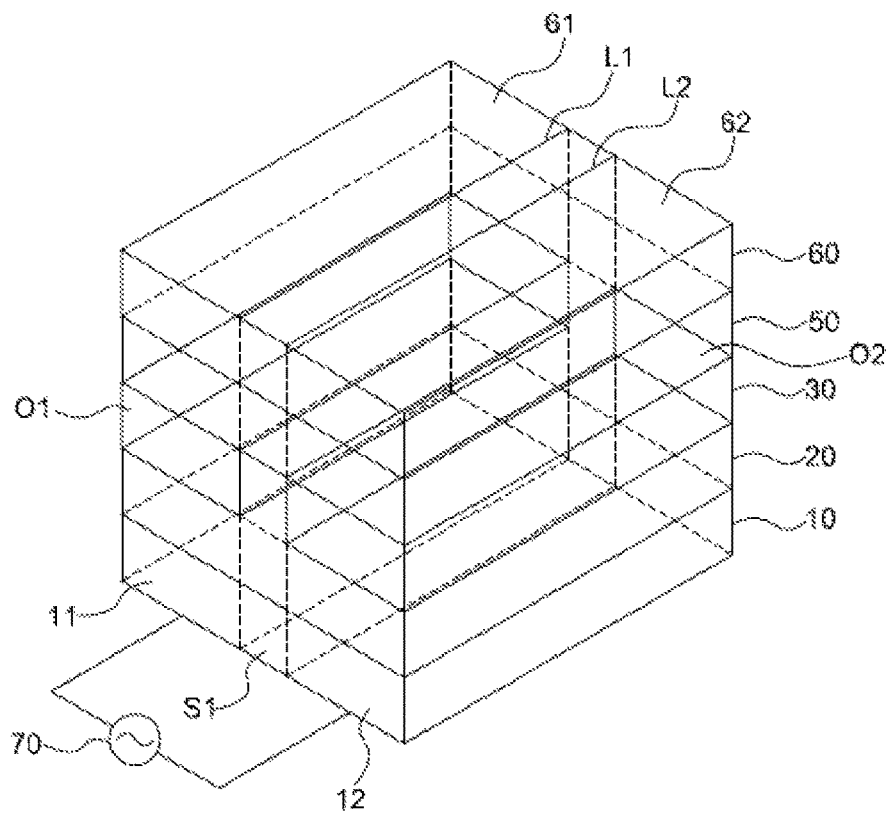

FIGS. 1A and 1B are a cross-sectional view and a perspective view of an AC electroluminescence device 100A according to an embodiment of the present invention, respectively.

Referring to FIG. 1A, the AC electroluminescence device 100 may include a bottom electrode 10 including a first electrode 11 and a second electrode 12, an electron injecting layer 20, an emission layer 30, a dielectric layer 50, and a top electrode 60. The first electrode 11 and the second electrode 12 may be arranged a distance S1 apart from each other.

The first electrode 11 and the second electrode 12 of the bottom electrode 10 may be transparent electrodes having high transmittance and conductivity. According to an embodiment, at least one of the first electrode 11 and the second electrode 12 may be a transparent electrode formed of indium tin oxide (ITO), indium zinc oxide (IZO), carbon nanotube (CNT) graphene, silver (Ag) nano wire, a metal mesh, and hybrid metal embedded, but is not limited thereto. Furthermore, the bottom electrode 10 may be formed on a glass substrate (not shown) through a thin film deposition operation, such as sputter deposition or chemical vapor deposition.

AC power may be applied between the first electrode 11 and the second electrode 12 of the bottom electrode 10. While the AC power is being applied, the first electrode 11 of the bottom electrode 10 may provide electrons to the electron injecting layer 20 during a first half-period in which a negative bias is applied to the first electrode 11 and may provide holes to the electron injecting layer 20 during a second half-period in which a positive bias is applied to the first electrode 11. Furthermore, the second electrode 12 of the bottom electrode 10 may also provide holes to the electron injecting layer 20 during the first half-period and provide electrons to the electron injecting layer 20 during the second half-period. The AC power may be a sine wave or a square wave, but is not limited thereto.

The electron injecting layer 20 may be disposed on the bottom electrode 10 including the first electrode 11 and the second electrode 12. The electron injecting layer 20 may transfer electrons to the emission layer 30 by controlling movement of carriers (electrons and/or holes) supplied from the bottom electrode 10. For example, the electron injecting layer 20 may transfer electrons supplied during the first half-period from the first electrode 11 of the bottom electrode 10 to the emission layer 30 and prevent holes supplied during the second half-period from the first electrode 11 of the bottom electrode 10 from being transferred to the emission layer 30. Similarly, the electron injecting layer 20 may prevent holes supplied during the first half-period from the second electrode 12 of the bottom electrode 10 from being transferred to the emission layer 30 and transfer electrons supplied during the second half-period from the second electrode 12 of the bottom electrode 10 to the emission layer 30. To this end, the electron injecting layer 20 may be designed to have low conduction band and baseband of the energy band. In this case, the size of an energy barrier for injection of electrons from the first or second electrode 11 or 12 to the electron injecting layer 20 is reduced, and the size of an energy barrier for injecting holes may be increased to prevent injection of holes from the first or second electrode 11 or 12 to the electron injecting layer 20. Detailed description thereof will be given below with reference to FIGS. 3A and 3B.

According to an embodiment. the electron injecting layer 20 may include at least one of materials including a composite material (ZnO:PEI) of polyethylenimine (PEI) and zinc oxide (ZnO), Alq3 (tris(8-hydroxyquinoline) aluminum), Balq (Bis(2-methyl-8-quinolinolate)-4-(phenylphenolato)aluminium: Balq), Bebq2 (bis(10-hydroxybenzo [h] quinolinato)-beryllium: Bebq2), BCP (2,9-dimethyl-4,7-diphenyl-1,10-phenanthroline), Bphen (4,7-diphenyl-1,10-phenanthroline), TPBI ((2,2',2"-(benzene-1,3,5-triyl)-tris(1-phenyl-1H-benzimidazole), TAZ (3-(4-biphenyl)-4-phenyl-5-tert-butylphenyl-1,2,4-triazole), NTAZ (4-(naphthalen-1-yl)-3,5-diphenyl-4H-1,2,4-triazole), NBphen (2,9-bis (naphthalen-2-yl)-4,7-diphenyl-1,10-phenanthroline), 3TPYMB (Tris(2,4,6-trimethyl-3-(pyridin-3-yl)phenyl)borane: 3TPYMB), POPy2 (Phenyl-dipyrenylphosphine oxide), BP4mPy (3,3',5,5'-tetra[(m-pyridyl)-phen-3-yl]biphenyl), TmPyPB (1,3,5-tri[(3-pyridyl)-phen-3-yl]benzene), BmPyPhB (1,3-bis[3,5-di(pyridin-3-yl)phenyl]benzene), Bepq2 (Bis(10-hydroxybenzo[h]quinolinato) beryllium), DPPS (Diphenylbis(4-(pyridin-3-yl)phenyl)silane), TpPyPB (1,3,5-tri(p-pyrid-3-yl-phenyl)benzene), Bpy-OXD (1,3-bis[2-(2,2'-bipyridine-6-yl)-1,3,4-oxadiazo-5-yl]benzene), BP-OXD-Bpy (6,6'-bis[5-(biphenyl-4-yl)-1, 3,4-oxadiazo-2-yl]-2,2'-bipyridyl), tBu-PBD (2-(4-Biphenylyl)-5-(4-tert-butylphenyl)-1,3,4-oxadiazole), and ADN (9,10-di(naphthalene-2-yl) anthrascene). However, these materials are merely examples, and embodiments of the present invention are not limited thereto.

The emission layer 30 may be disposed on an upper of the electron injecting layer 20. The emission layer 30 may emit light by electrons injected from the electron injecting layer 20. For example, the electrons injected from the electron injecting layer 20 may be accelerated by an electric field in the emission layer 30 and collide with emission atoms in the emission layer 30 due to the acceleration. Due to the collision, electrons of the emission atoms are transited from the ground state to the excited state, and the electrons of the emission atoms return from the excited state to the ground state, and thus light may be emitted from the interior of the emission layer 30. According to another embodiment, as electrons injected from the electron injecting layer 20 recombine with holes of the baseband of the emission layer 30, light may be emitted. Furthermore, as described below with reference to FIGS. 2A and 2B, when a hole injecting layer 40 is disposed between the emission layer 30 and the dielectric layer 50, electrons injected from the electron injecting layer 20 may recombine with holes injected from the hole injecting layer 40 and emit light in the emission layer 30.

According to an embodiment, the emission layer 30 may have a polymer matrix structure including a dye material. For example, a carbon nanotube may be combined with a dye material (e.g., PDY 132 (SY: super yellow) from Merck), and the carbon nanotube may be one from among a single-walled nanotube (SWNT), a double-walled carbon nanotubes, and a multi-walled nanotube (MWNT).

According to various embodiments, the emission layer 30 is an organic material and may be either a host material or a dopant material (or guest material) that is injected into the host material. The host material may include at least one of Alq3, CBP (4,4'-N,N'-dicarbazole-biphenyl), PVK (poly(n-vinylcarbazole)), AND (9,10-di(naphthalene-2-yl)anthracene), TCTA (4,4',4"-tris(N-carbazolyl)-triphenylamine), TPBI (1,3,5-tris(N-phenylbenzimidazole-2-yl)benzene), TBADN (3-tert-butyl-9,10-di-2-naphthylanthracene)), E3, DSA (distyrylarylene), BCzVB (1, 4-bis[2-(3-Nethylcarbazoryl)vinyl]benzene), DPAVB (4-(di-p-tolylamino)-4'-[(di-p-tolylamino)styryl]stilbene), and NBDAVBi (N-(4-((E)-2-(6-((E)-4-(diphenylamino)styryl)naphthalene-2-yl)vinyl) phenyl-N-phenylbenzenamine)), but is not limited thereto. The dopant material may include at least one of DCM (4-dicyanomethylene-2-methyl-6-pdimethylaminostyryl-4H-pyran), PtOEP, Ir(piq)3, Btp2Ir(acac), Ir(ppy)3 (ppy=phenylpyridine), Ir(ppy)2(acac), Ir(mpyp)3, F2Irpic, (F2 ppy)2Ir(tmd), Ir(dfppz)3, ter-fluorene, 4,4'-bis 4-diphenylaminostyryl)biphenyl (DPAVBi), and 2,5,8,11-tetra-t-butyl pherylene (TBPe), but is not limited thereto.

According to another embodiment, the emission layer 30 may be formed of an inorganic material, such as ZnSe, ZnTe, CdS, CdSe, CaS, SrS, CaSe, SrSe, ZnMgS, CaSSe, CaSrS, CaGa$_2$S$_4$, SrGa$_2$S$_4$, BaGa$_2$S$_4$, CaAl$_2$S$_4$, SrAl$_2$, BaAl$_2$S$_4$, Ga$_2$O$_3$, Y$_2$O$_3$, CaO, GeO$_2$, SnO$_2$, Zn$_2$SiO$_4$, Zn$_2$GeO$_4$, ZnGa$_2$O$_4$, CaGa$_2$O$_4$, CaGeO$_3$, MgGeO$_3$, Y$_4$GeO$_8$, Y$_2$GeO$_5$, Y$_2$Ge$_2$O$_7$, Y$_2$SiO$_5$, BeGa$_2$O$_4$, Sr$_3$Ga$_2$O$_6$, Zn$_2$SiO$_4$—Zn$_2$GeO$_4$, Ga$_2$O$_3$—Al$_2$O$_3$, CaO—Ga$_2$O$_3$, and Y$_2$O$_3$—GeO$_2$, but is not limited thereto.

According to another embodiment, the emission layer 30 may include an organic material, that is, a host material and a dopant material to be injected into the host material. Although light may be emitted only by the host material or the dopant material, in order to improve the efficiency and luminance of light, the emission layer 30 may be formed by doping the host material with the dopant material. For example, a material having a high quantum efficiency, such as Quinacridone, may be doped in Alq3, which is a host material emitting green light, in order to increase the light emission efficiency.

The dielectric layer 50 may be disposed over the emission layer 30. The dielectric layer 50 may prevent carriers (that is, electrons and/or holes) from moving between the top electrode 60 and the bottom electrode 10. According to an embodiment. the dielectric layer 50 may include at least one of insulators including silicon dioxide (SiO$_2$), titanium monoxide (TiO$_2$), tungsten dioxide (WO$_2$), hafnium dioxide (HfO$_2$), aluminum oxide (Al$_2$O$_3$), yttriumoxide (Y$_2$O$_3$), cerium oxide (CeO$_2$), tantalum oxide (Ta$_2$O), zirconium dioxide (ZrO$_2$), barium titanate (BaTiO$_3$), SrTiO$_3$ (STO), PVDF, P(VDF/TrFE), P(VDF/TrFE/HFP), P(VDF/TeFE), PVF, P(VF/TrFE), PAN, and P(VDCN/VAc), but is not limited thereto.

The top electrode 60 may be disposed on the dielectric layer 50. The top electrode 60 may include a first portion 61 that faces the first electrode 11 of the bottom electrode 10 and a second portion 62 that faces the second electrode 12 of the bottom electrode 10.

Since carriers (that is, electrons and/or holes) injected from the top electrode 60 are blocked by the dielectric layer 50, the emission mechanism in the emission layer 30 may be substantially unaffected by the top electrode 60. Therefore, according to an embodiment of the present invention, the energy band structure between the top electrode 60 and underlying layers therebelow does not affect the emission mechanism, thereby allowing various conductive materials (e.g., Al, Au, Ag, and Cu) or a conductive object (e.g., a finger or a stylus pen) as the top electrode 60.

Referring to FIGS. 1A and 1B, an AC electroluminescence device 100A may include a first emission region O1 defined by a first overlapping region of the emission layer 30 between the first portion 61 of the top electrode 60 and the first electrode 11 of the bottom electrode 10 and a second emission region O2 defined by a second overlapping region of the emission layer 30 between the second portion 62 of the top electrode 60 and the second electrode 12 of the bottom electrode 10. A line L1 is an imaginary line for indicating the first overlapping region of the emission layer 30 between the first portion 61 of the top electrode 60 and the first electrode 11 of the bottom electrode 10, and a line L2 is an imaginary line for indicating the second overlapping region of the emission layer 30 between the second portion 62 of the top electrode 60 and the second electrode 12 of the bottom electrode 10.

Although FIG. 1A shows two emission regions (the first emission region and the second emission region), arrangements of emission region may vary according to structures of the bottom electrode 10. For example, when the bottom electrode 10 includes a plurality of sub-electrodes arranged therein, a plurality of sub-emission regions arranged in correspondence to the plurality of sub-electrodes of the bottom electrode 10 may be defined.

AC power 70 may be applied between the first electrode 11 and the second electrode 12 of the bottom electrode 10 that are distance S1 apart from each other. The top electrode 60 may electrically interconnect the first overlapping region of the first electrode 11 of the bottom electrode 10 and the second overlapping region of the second electrode 12 of the bottom electrode 10. In other words, the first electrode 11 and the second electrode 12 of the bottom electrode 10 that are apart from each other may be electrically connected to each other by the top electrode 60.

In the first overlapping region O1 and the second overlapping region O2 of the emission layer 30 electrically connected to each other by the top electrode 60, light may be emitted in the first emission region O1 during the first half-period and light may be emitted in the second overlapping region O2 during the second half-period. Although light is alternately emitted by the first overlapping region and the second overlapping region, alternating time of light emission decreases as frequency of AC power increases, and thus it may be seen as if light is simultaneously emitted by the first overlapping region and the second overlapping region.

Figure 2A:
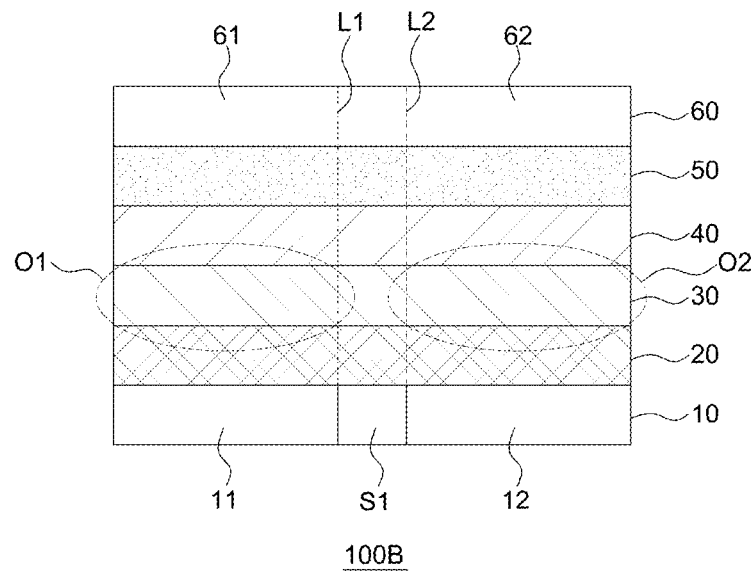
FIGS. 2A and 2B are a cross-sectional view and a perspective view of an AC electroluminescence device according to an embodiment of the present invention, respectively.
Figure 2B:
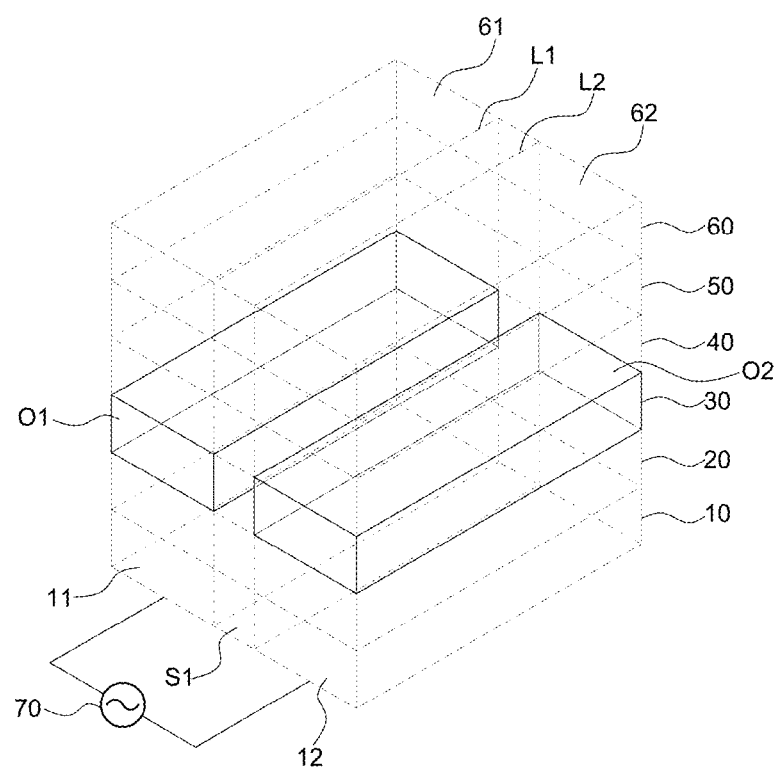

FIGS. 2A and 2B are a cross-sectional view and a perspective view of an AC electroluminescence device 100B according to an embodiment of the present invention, respectively.

Referring to FIGS. 2A and 2B, the AC electroluminescence device 100B may include the bottom electrode 10 including the first electrode 11 and the second electrode 12, the electron injecting layer 20, the emission layer 30, the hole injecting layer 40, the dielectric layer 50, and the top electrode 60. Unless being contradictory, the descriptions given above with reference to FIGS. 1A and 1B may be referred to in relation to the bottom electrode 10 including the first electrode 11 and the second electrode 12, the electron injecting layer 20, the emission layer 30, the hole injecting layer 40, the dielectric layer 50, and the top electrode 60.

The hole injecting layer 40 disposed between the emission layer 30 and the dielectric layer 50 may transfer holes to the emission layer 30. For example, since electrons and/or holes may not be transferred from the top electrode 60 to the emission layer 30 due to the dielectric layer 50, the hole injecting layer 40 may inject holes into the emission layer 30 to increase light emission efficiency.

According to an embodiment, the hole injecting layer 40 may include at least one of materials including PEDOT/PSS (Poly(3,4-ethylenedioxythiophene)/Poly(4-styrenesulfonate)), a phthalocyanine compound, DNTPD (N,N'-diphenyl-N,N'-bis-[4-(phenyl-m-tolyl-amino)-phenyl]-biphenyl-4,4'-diamine), m-MTDATA (4,4',4"-tris(3-methylphenylphenylamino)triphenylamine), TDATA (4,4'4"-Tris(N,N-diphenylamino)triphenylamine), 2T-NATA (4,4',4"-tris{N,-(2-naphthyl)-N-phenylamino}-triphenylamine), α-NPD (N,N'-bis(naphthalen-1-yl)-N,N'-bis(phenyl)-2,2'-dimethylbenzidine), PANI/DBSA (Polyaniline/Dodecylbenzenesulfonic acid), PANI/CSA (Polyaniline/Camphor sulfonicacid), PANI/PSS (Polyaniline)/Poly(4-styrenesulfonate), N,N'-di(naphthalene-1-yl)-N,N'-diphenyl-benzidine (NPB), poly(N-vinylcarbazole) (PVK), poly(4-vinyltriphenylamine) (PVTTA), poly[N-(4-{N'-[4-(4-diphenylamino)phenyl]phenyl-N'-phenylamino}phenyl)methacrylamide] (PTPDMA), and poly[N,N'-bis(4-butylphenyl)-N,N'-bis(phenyl)benzidine (Poly-TPD), but is not limited thereto.

According to an embodiment of the present invention, when the hole injecting layer 40 is disposed between the emission layer 30 and the dielectric layer 50, some of electrons injected from the electron injecting layer 20 into the emission layer 30 may more likely be recombined holes injected from the hole injecting layer 40 inside the emission layer 30. Therefore, the possibility of existence of electrons that are transited from the ground state to the excited state due to recombination of electrons-holes other than electron collision increases, and thus AC light emission efficiency may be improved.

Figure 3A:
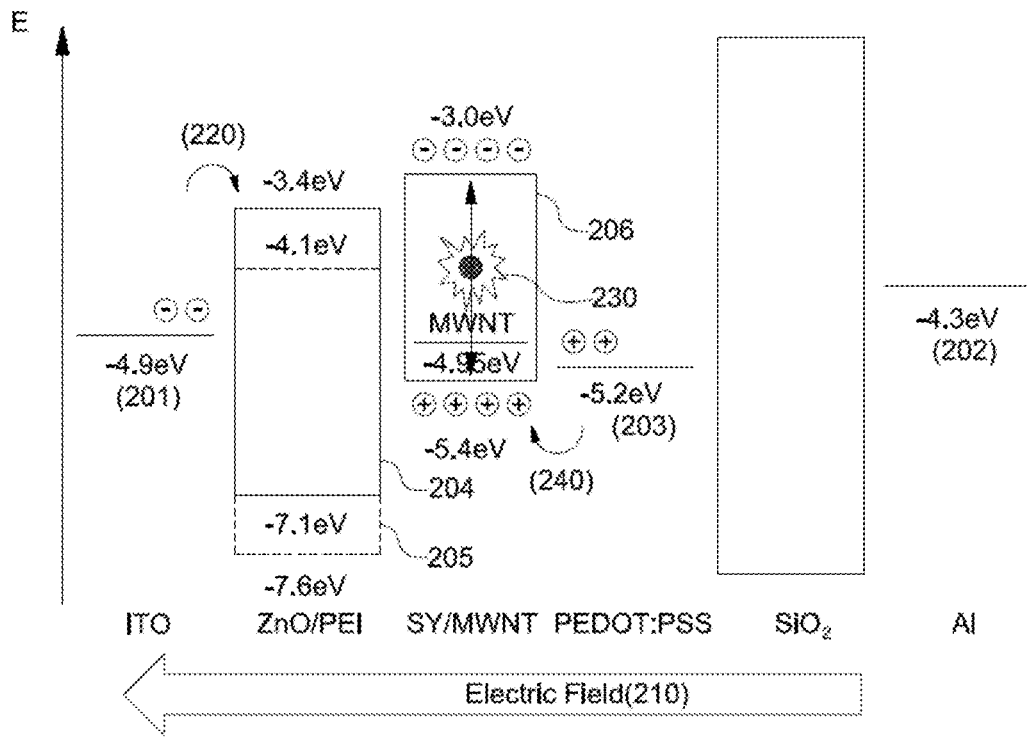
FIGS. 3A and 3B are energy band diagrams of an AC electroluminescence device according to an embodiment of the present invention.
Figure 3B:
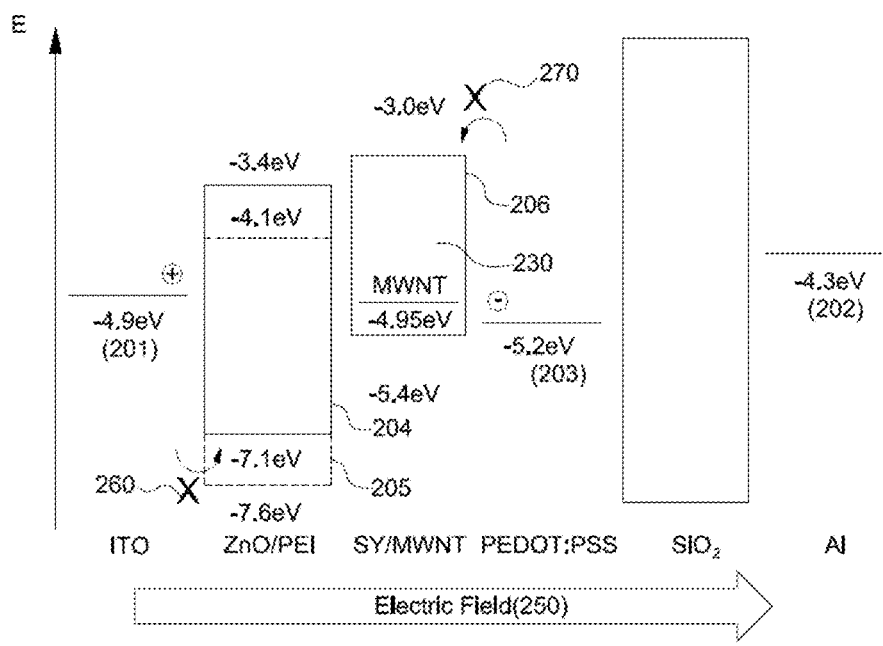

FIGS. 3A and 3B are energy band diagrams of an AC electroluminescence device according to an embodiment of the present invention.

Referring to FIG. 3A, the bottom electrode 10 includes ITO, the electron injecting layer 20 includes ZnO/PEI, and the emission layer 30 includes SY/MWNT. FIG. 3A shows an example energy band diagram when the hole injecting layer 40 includes PEDOT:PSS, the dielectric layer 50 includes $SiO_2$, and the top electrode 60 includes an aluminum (Al) based material.

The work function of ITO is about −4.9 eV (201), the work function of Al is about −4.3 eV (202), and the work function of PEDOT:PSS is about −5.2 eV (203)/ When the electron injecting layer 20 includes ZnO/PEI, the energy band of the electron injecting layer 20 may be lowered from an energy band from about −3.4 eV to about −7.1 eV (204) to an energy band from about −4.1 eV to about 7.6 eV (205). When the emission layer 30 includes SY/MWNT, the energy band may be from about −3.0 eV to −4.95 eV (206).

Generally, ITO injects holes. However, in embodiments of the present invention, the electron injecting layer 20 including ZnO/PEI may be introduced to provide an inverted structure for injecting electrons from ITO. As a result, due to low energy band structure of ZnO/PEI, electrons injected from ITO may be easily transferred to the emission layer 30 through the electron injecting layer 20, whereas holes injected from ITO injected into the electron injecting layer 20 may be prevented from being transferred to the emission layer 30 through the electron injecting layer 20.

As shown in FIG. 3A, when an electric field is formed from the top electrode 60 toward the bottom electrode 10, that is, in a direction from Al to ITO during the first half-period (210), electrons are injected from ITO (220) and the electrons from the ITO may easily move to the emission layer 30 (e.g., SY/MWNT) by the injecting layer 20 and collide with atoms inside the emission layer 30 (230). Holes from Al electrode are blocked by the high energy barrier of the dielectric layer 50, but holes may be injected into the emission layer 30 by the hole injecting layer 40 (240). Therefore, the emission layer 30 may emit light as electrons are transited from the ground state to the excited state due to collision between electrons and/or recombination of electrons and holes (230).

As shown in FIG. 3B, when an electric field is formed from the bottom electrode 10 toward the top electrode 60, that is, a direction from ITO to Al during the second half-period (250), holes are injected from the ITO, but the holes may not be transferred to the emission layer 30 (e.g., SY/MWNT) due to the energy barrier of the electron injecting layer 20 (260). Furthermore, electrons from Al may also be blocked by the high energy band of the dielectric layer 50. In order for electrons to be injected into the emission layer 30 by the hole injecting layer 40, the work function of the hole injecting layer 40 should be greater than or equal to −3.0 eV. However, since the work function of the hole injecting layer 40 is −5.2 eV, electrons may not be transferred from the hole injecting layer 40 to the emission layer 30 (e.g., SY/MWNT). Therefore, electrons and holes do not recombine with each other inside the emission layer 30, and thus light may not be emitted.

Figure 4A:
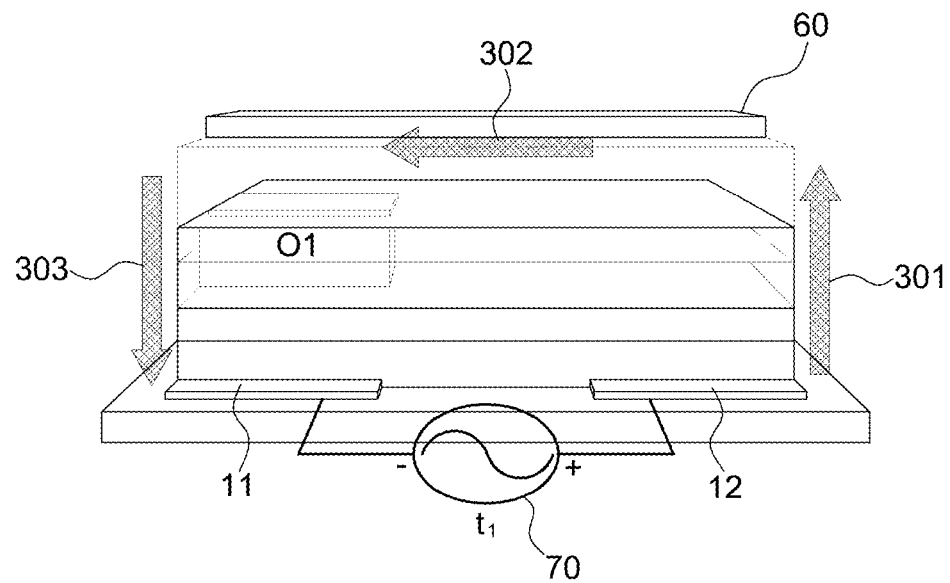
FIGS. 4A and 4B are cross-sectional views showing electric field flows of an AC electroluminescence device according to an embodiment of the present invention.
Figure 4B:
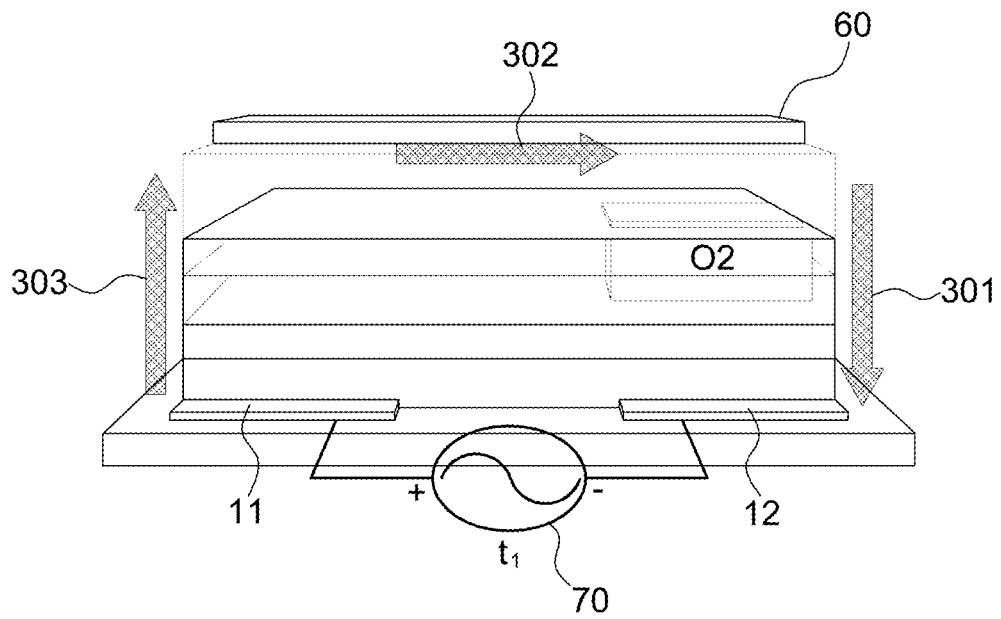

FIGS. 4A and 4B are cross-sectional views showing electric field flows of an AC electroluminescence device according to an embodiment of the present invention.

Referring to FIG. 4A, during one period t1, (−) power may be supplied to the first electrode 11 of the bottom electrode 10 and (+) power may be supplied to the second electrode 12. The first electrode 11 and the second electrode 12 of the bottom electrode 10 that are apart from each other may be electrically connected to each other by the top electrode 60 in a structure in which the bottom electrode 10, the electron injecting layer 20, the emission layer 30, the hole injecting layer 40, the dielectric layer 50, and the top electrode 60 are stacked.

Here, an electric field may be formed in a counterclockwise direction from the second electrode 12 of the bottom electrode 10 to the top electrode 60 (301), from the second emission region O2 of the emission layer 30 to the first emission region O1 of the emission layer 30 (302), and from the top electrode 60 to the first electrode 11 of the bottom electrode 10 (303). Therefore, based on the energy band diagram shown in FIGS. 3A and 3B, light is only emitted by the first emission region O1 of the emission layer 30.

Referring to FIG. 4B, during one period t2, (+) power may be supplied to the first electrode 11 of the bottom electrode 10 and (−) power may be supplied to the second electrode 12. The first electrode 11 and the second electrode 12 of the bottom electrode 10 apart from each other may be electrically connected to each other by the top electrode 60.

Here, an electric field may be formed in a clockwise direction from the first electrode 11 of the bottom electrode 10 to the top electrode 60 (313), from the first emission region O1 of the emission layer 30 to the second emission region O2 of the emission layer 30 (312), and from the top electrode 60 to the second electrode 12 of the bottom electrode 10 (311). Therefore, based on the energy band diagram shown in FIGS. 3A and 3B, light is only emitted by the second emission region O2 of the emission layer 30.

Figure 5A:
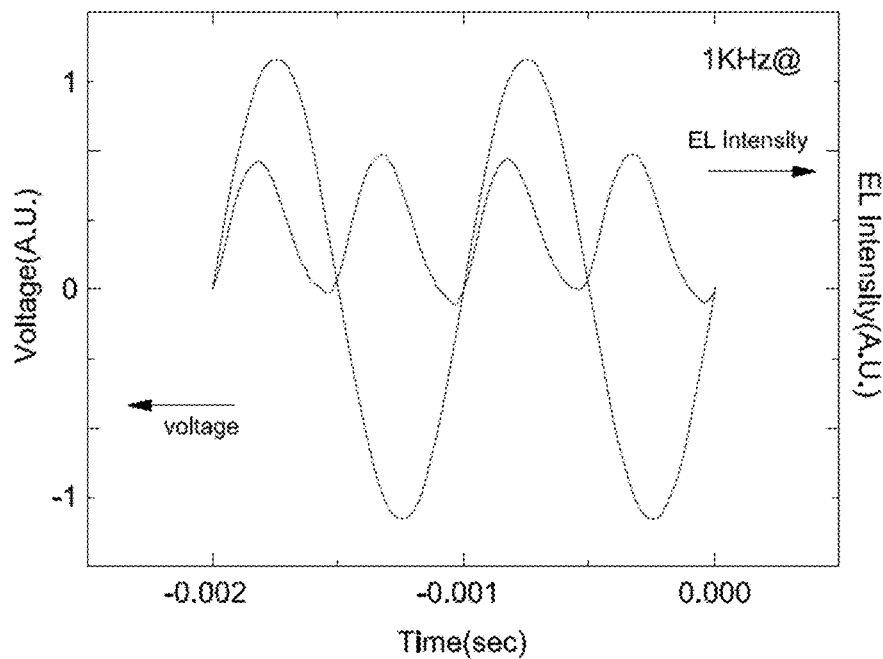
FIGS. 5A and 5B are graphs showing intensities of light emitted by an AC electroluminescence device according to an embodiment of the present invention as power is applied thereto.
Figure 5B:
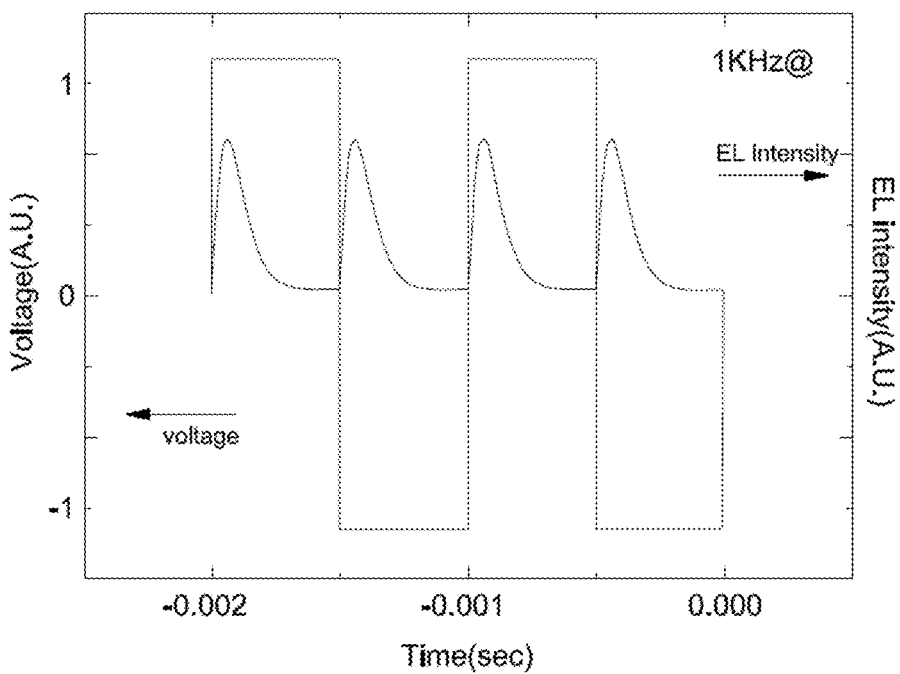

FIGS. 5A and 5B are graphs showing intensities of light emitted by an AC electroluminescence device according to an embodiment of the present invention as power is applied thereto.

Referring to FIG. 5A, there is shown a graph showing the intensity of light according to an AC voltage signal having a sinusoidal waveform. When an AC voltage signal of 1 kHz having a sinusoidal waveform is applied between the first electrode 11 of the bottom electrode 10 and the second electrode 12 of the bottom electrode 10 of FIGS. 1A and 1B, light may be emitted in the first emission region during the first half-period and light may be emitted in the second emission region during the second half-period.

Referring to FIG. 5B, there is shown a graph showing the intensity of light according to a voltage signal of a square wave. When a voltage signal of 1 kHz having a square waveform is applied between the first electrode 11 of the bottom electrode 10 and the second electrode 12 of the bottom electrode 10 of FIGS. 1A and 1B, light may be emitted in the first emission region during the first half-period and light may be emitted in the second emission region during the second half-period.

Figure 6A:
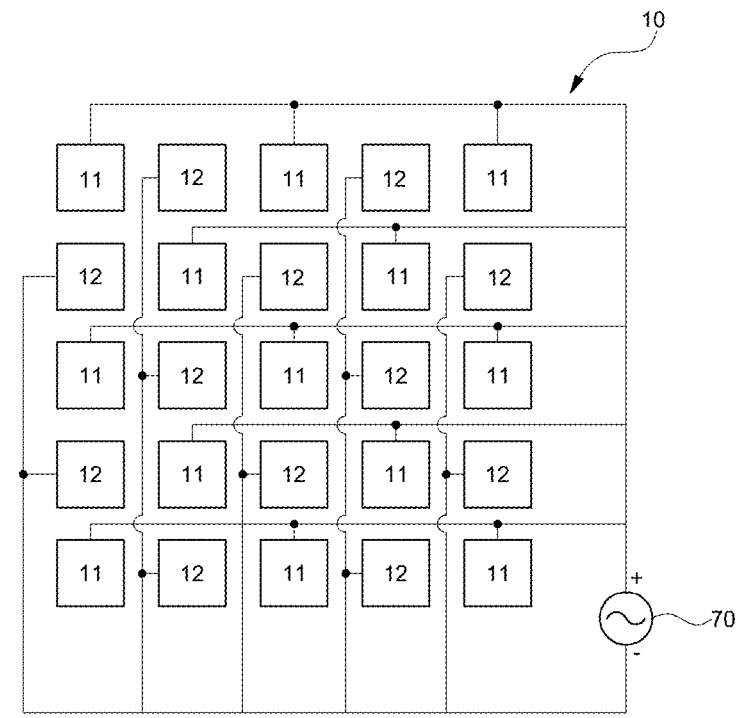
FIGS. 6A and 6B are diagrams for describing a configuration of a bottom terminal of an AC electroluminescence device according to an embodiment of the present invention.
Figure 6B:
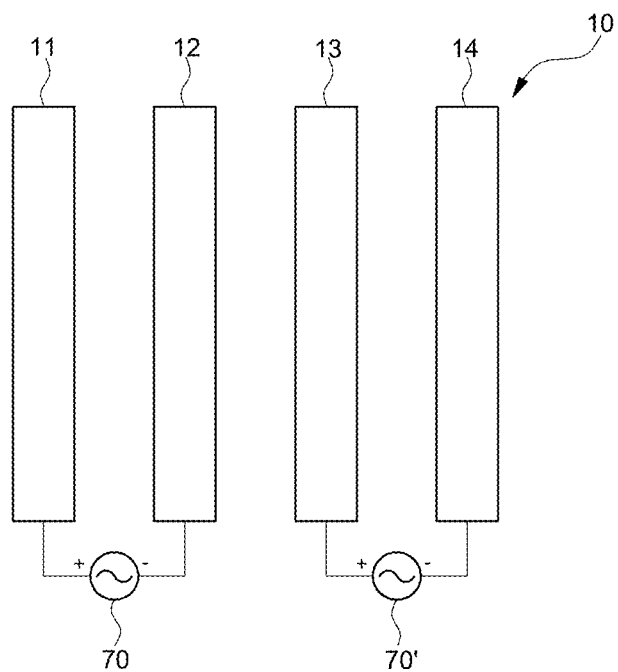

FIGS. 6A and 6B are diagrams for describing a configuration of a bottom terminal of an AC electroluminescence device according to an embodiment of the present invention.

Referring to FIG. 6a, a bottom terminal constitutes a structure in which a plurality of sub-electrodes are arranged, and some sub-electrodes 11 from among the plurality of sub-electrodes may be connected to the (+) pole of the AC power 70, whereas the other sub-electrodes (12) from among the plurality of sub-electrodes may be connected to the (−) pole of the AC power 70. The sub-electrode 11 and the sub-electrode 12 may be apart from each other.

Referring to FIG. 6B, a bottom terminal 10 may have a structure in which four sub-electrodes are arranged. A first AC power 70 may be applied between a first sub-electrode 11 and a second sub-electrode 12 and a second AC power 70' may be applied between a third sub-electrode 13 and a fourth sub-electrode 14.

Figure 7:
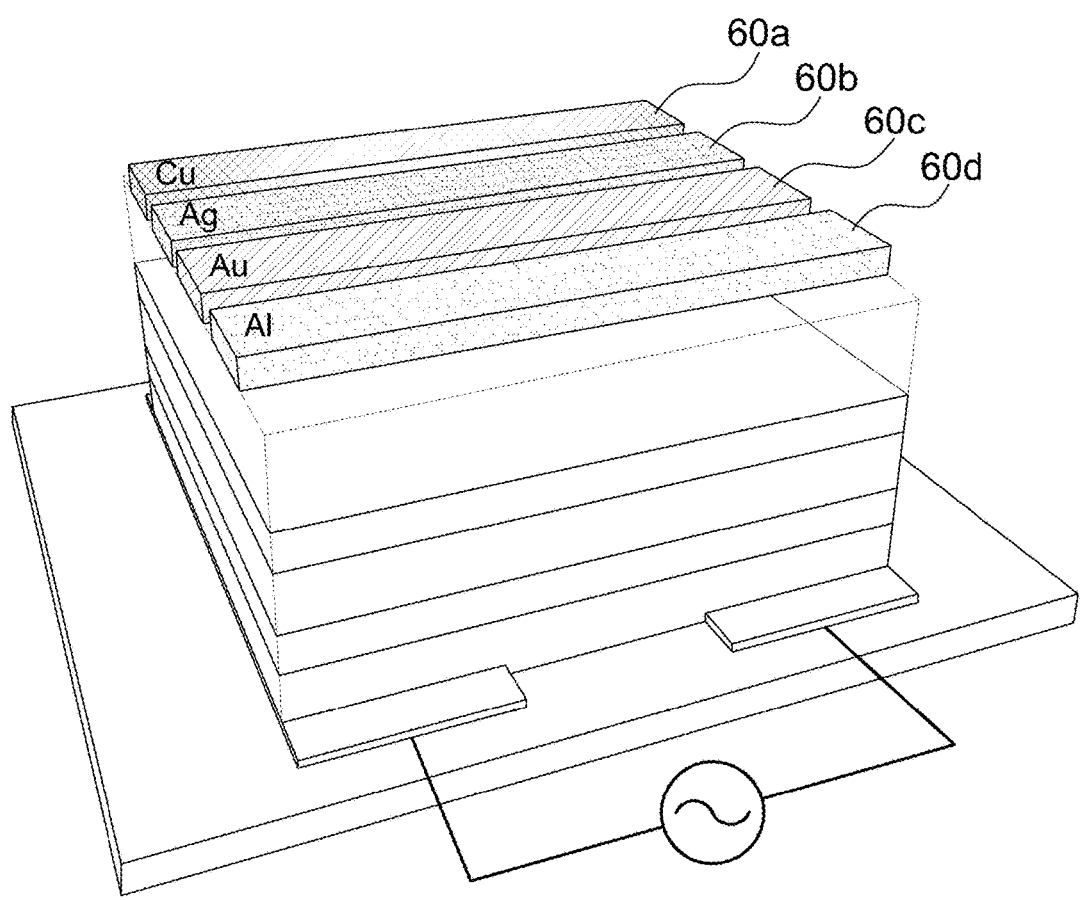
FIG. 7 is a 3-dimensional cross-sectional view of an AC electroluminescence device employing various types of metals for a top electrode, according to an embodiment of the present invention.

FIG. 7 is a 3-dimensional cross-sectional view of an AC electroluminescence device employing various types of metals for a top electrode, according to an embodiment of the present invention.

Referring to FIG. 7, there is shown an AC electroluminescence device in which the top electrode 60 of FIG. 2A includes four sub-electrodes 60a, 60b, 60c, and 60d. Here, the material constituting the first sub-electrode 60a may be Cu, the material constituting the second sub-electrode 60b may be Ag, the material constituting the third sub-electrode 60c may be Au, and the material constituting the fourth sub-electrode 60d may be Al.

Unless being contradictory, the descriptions given above with reference to FIG. 1A may be referred to in relation to the bottom electrode 10 including the first electrode 11 and the second electrode 12, the electron injecting layer 20, the emission layer 30, the hole injecting layer 40, the dielectric layer 50, and the top electrode 60.

Figure 8A:
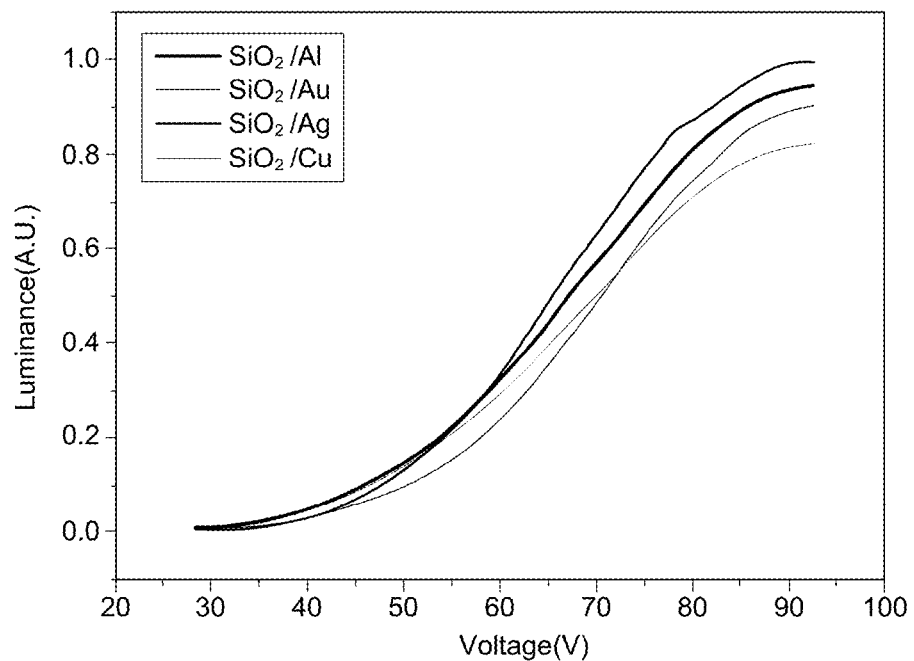
FIG. 8A is a graph showing the luminance of an AC electroluminescence device employing various types of metals for a top electrode, according to an embodiment of the present invention according to change of voltage.

FIG. 8A is a graph showing the luminance of an AC electroluminescence device employing various types of metals for a top electrode, according to an embodiment of the present invention according to change of voltage.

Referring to FIG. 8A, $SiO_2/Cu$ is the luminance of light emitted by the overlapping region of the emission layer 30 between the first sub-electrode 60a of the top electrode 60 and the bottom electrode 10 when the dielectric layer 50 includes $SiO_2$ and the first sub-electrode 60a of the top electrode 60 includes Cu in the AC electroluminescence device of FIG. 7, $SiO_2/Ag$ is the luminance of light emitted by the overlapping region of the emission layer 30 between the second sub-electrode 60b of the top electrode 60 and the bottom electrode 10 when the dielectric layer 50 includes $SiO_2$ and the second sub-electrode 60b of the top electrode 60 includes Ag in the AC electroluminescence device of FIG. 7, $SiO_2/Au$ is the luminance of light emitted by the overlapping region of the emission layer 30 between the third sub-electrode 60c of the top electrode 60 and the bottom electrode 10 when the dielectric layer 50 includes $SiO_2$ and the third sub-electrode 60c of the top electrode 60 includes Au in the AC electroluminescence device of FIG. 7, and $SiO_2/Al$ is the luminance of light emitted by the overlapping region of the emission layer 30 between the fourth sub-electrode 60d of the top electrode 60 and the bottom electrode 10 when the dielectric layer 50 includes $SiO_2$ and the fourth sub-electrode 60d of the top electrode 60 includes Al in the AC electroluminescence device of FIG. 7.

The luminance of $SiO_2$/Al, $SiO_2$/Au, $SiO_2$/Ag and $SiO_2$/Al are increased as the AC voltage increases, where the luminance corresponding respective metals slightly differ from one another in a some period (e.g., from 65V to 100V). However, it may be seen that light is emitted regardless of a material constituting the top electrode 60, although there are differences between luminance corresponding to respective metals. Since respective energy bands of the bottom electrode 10, the electron injecting layer 20, the emission layer 30, and the hole injecting layer 40 (refer to FIGS. 3A and 3B) stacked below the top electrode 60 are optimized and movement of carriers is blocked by the energy barrier of the dielectric layer 50 disposed below the top electrode 60, variation of luminance according to materials constituting the top electrode 60 is insignificant. Therefore, since the top electrode 60 does not affect luminance, any conductive material may be used for the top electrode 60.

Figure 8B:
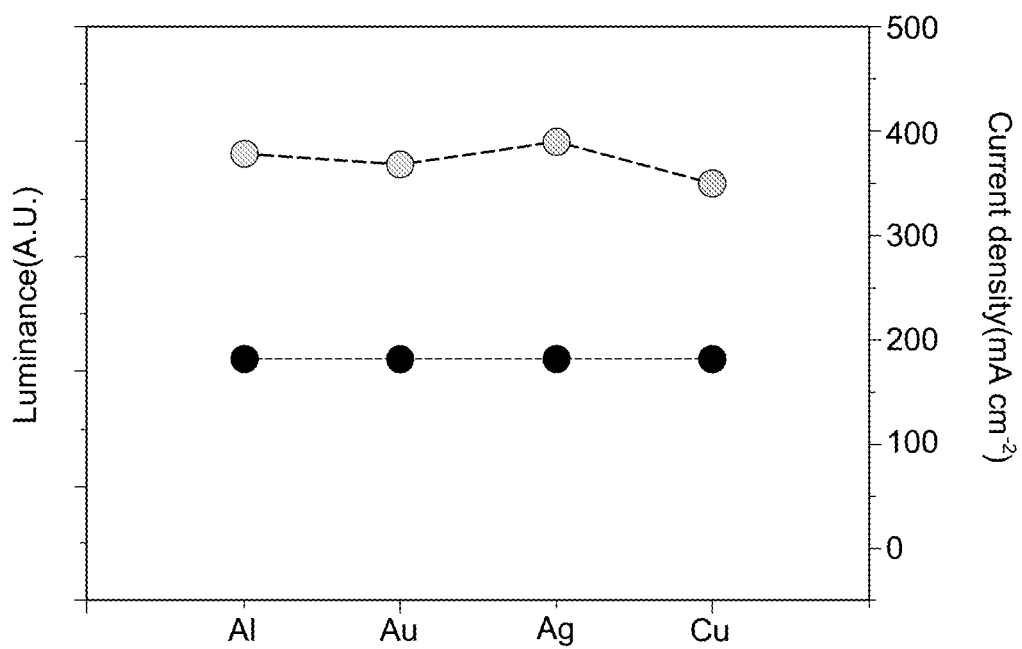
FIG. 8B is a graph showing the luminance and the current density of an AC electroluminescence device according to various metals based on a voltage change according to an embodiment of the present invention.

FIG. 8B is a graph showing the luminance and the current density of an AC electroluminescence device according to various metals based on a voltage change according to an embodiment of the present invention.

Referring to FIG. 8B, the luminance and current density of the AC electroluminescence device of FIG. 6 are compared when a constant AC voltage is applied. The results show that, although there is a slight difference between the luminance of $SiO_2$/Al, $SiO_2$/Au, $SiO_2$/Ag and $SiO_2$/Al, but differences between current densities thereof are insignificant. Therefore, the top electrode 60 may be formed of any conductive material having conductivity, so that the top electrode 60 may be replaced with a touch input of an object, such as a user's finger as shown in FIG. 8A.

Figure 9:
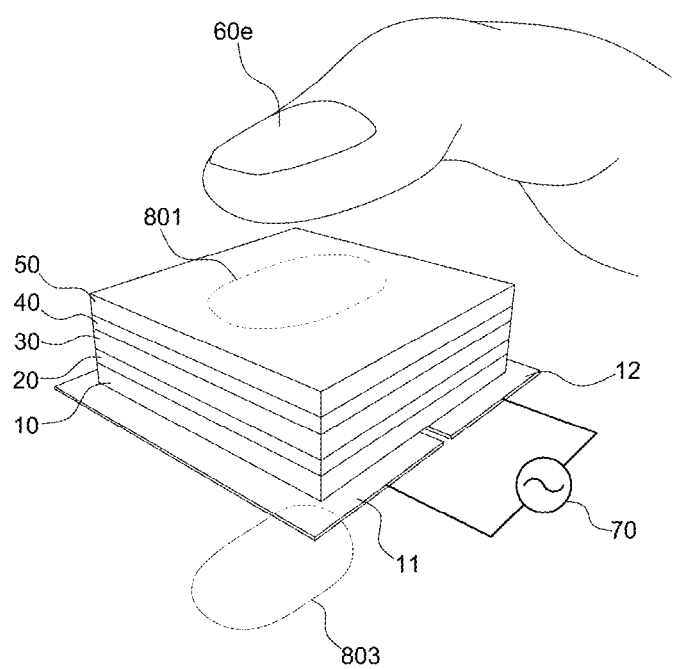
FIG. 9 is a perspective view of an AC electroluminescence device using a touch input pattern according to another embodiment of the present invention.

FIG. 9 is a perspective view of an AC electroluminescence device using a touch input pattern according to another embodiment of the present invention.

Referring to FIG. 9, in a structure where the components of the AC electroluminescence device of FIG. 1A except for the top electrode 60 are stacked, a touch input may be made onto the top of the top electrode 60 by a thumb 60e of a user. Here, a fingerprint 801 of the touch-input thumb 60e may function as the top electrode 60, and thus light may be emitted.

Figure 10:
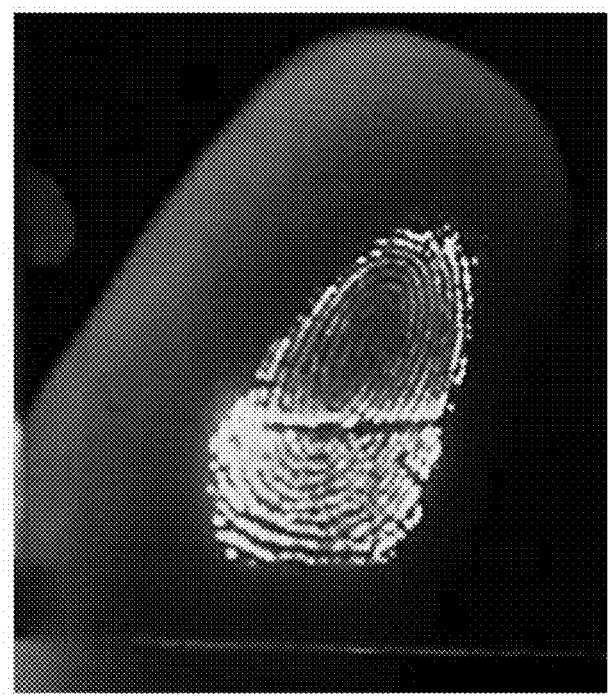
FIG. 10 is a plan view of an AC electroluminescence device viewed from a point above the bottom electrode 10, according to another embodiment of the present invention.

Here, since the fingerprint 801 of the touch-input thumb 60e substantially contacts the top of the dielectric layer 50, light may be emitted in the overlapping region of the emission layer 30 according to a touch input pattern corresponding to the fingerprint 801 of the thumb 60e. Therefore, light may be emitted in the form of the fingerprint 801 of the thumb 60e. Furthermore, since the bottom electrode 10 is a transparent electrode, light 803 in the form of the fingerprint 801 of the thumb 60e may be transmitted through the bottom electrode 10 as shown in FIG. 10. FIG. 10 is a plan view of an AC electroluminescence device viewed from a point above the bottom electrode 10, according to another embodiment of the present invention.

Figure 11:
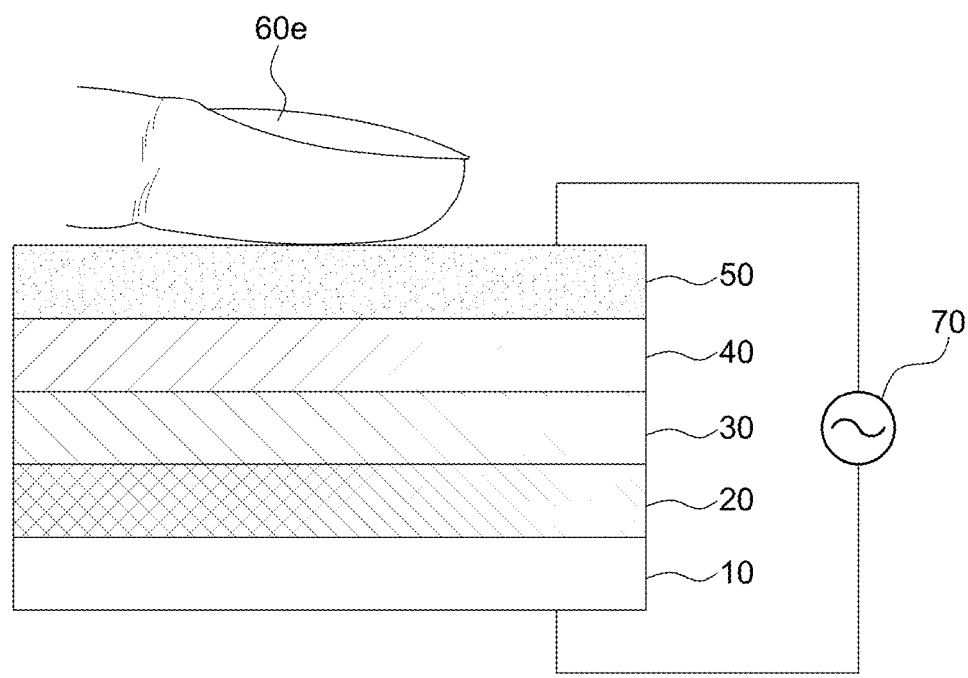
FIG. 11 is a cross-sectional view of an AC electroluminescence device using a touch input according to another embodiment of the present invention.

FIG. 11 is a cross-sectional view of an AC electroluminescence device using a touch input according to another embodiment of the present invention.

Referring to FIG. 11, in a structure where the components of the AC electroluminescence device of FIG. 2A except for the top electrode 60 are stacked, when a touch input may be made onto the top of the top electrode 60 by a thumb 60e of a user, the fingerprint 801 of the touch-input thumb 60e may function as the top electrode 60, and thus light may be emitted.

However, the AC electroluminescence device of FIG. 11 is different from the AC electroluminescence device of FIG. 9 for a connection to apply AC power. Although the AC power 70 is applied between the first electrode 11 and the second electrode 12 of the bottom electrode 10 in FIG. 9, the AC power 70 may be applied between the dielectric layer 50 and the bottom electrode 10. Furthermore, in FIG. 11, the bottom electrode 10 may be configured as a single electrode instead of separating the bottom electrode 10 to the first electrode 11 and the second electrode 12.

Figure 12:
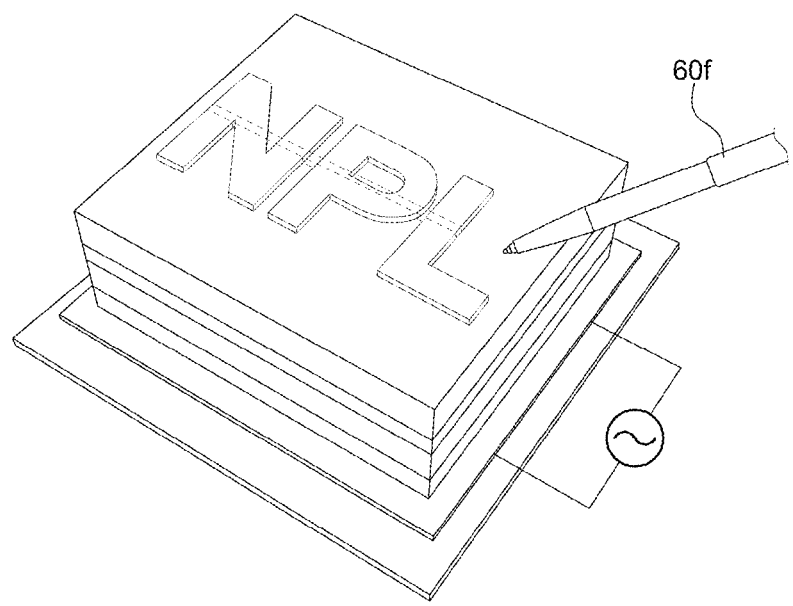
FIG. 12 is a perspective view of an AC electroluminescence device using a touch input according to another embodiment of the present invention.

FIG. 12 is a perspective view of an AC electroluminescence device using a touch input according to another embodiment of the present invention.

Referring to FIG. 12, a character corresponding to a touch input pattern may be displayed by using a pen 60f having conductivity, such as a stylus pen. For example, when a touch input pattern corresponding to characters 'NPL' is provided on the dielectric layer 50 by a stylus pen 60f instead of a finger in FIG. 8A, light corresponding to the characters 'NPL' may be emitted by the AC electroluminescence device.

While the foregoing embodiments have been described primarily with reference to an AC electroluminescence device, they are merely examples, and those skilled in the art will understand that the embodiments may also be applied to a devices used in fingerprint recognition sensor platform as shown in FIG. 11.

A sensor platform refers to an independent device including an AC electroluminescence device and a photodiode.

Figure 13:
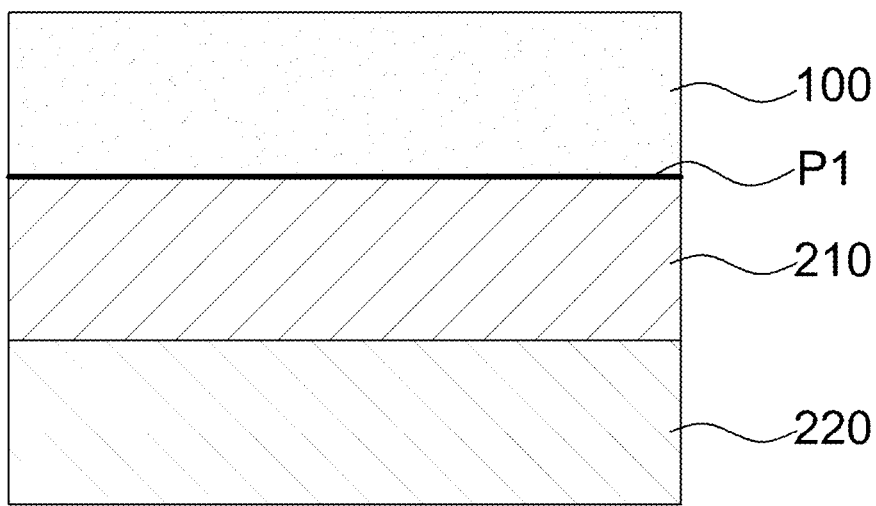
FIG. 13 is a diagram showing a fingerprint recognizing sensor platform according to another embodiment of the present invention.

FIG. 13 is a diagram showing a fingerprint recognizing sensor platform according to another embodiment of the present invention.

Referring to FIG. 13, the fingerprint recognizing sensor platform may include an AC electroluminescence device 100, a light receiving sensor layer 210, and a processor 220. Unless being contradictory, the descriptions given above with reference to FIGS. 1A and/or 2A may be referred to in relation to the AC electroluminescence device 100.

The light receiving sensor layer 210 may be disposed on a second main surface P1 opposite to a first main surface of the bottom electrode 10 on which the electron injecting layer 20 of the AC electroluminescence device 100 is formed and detect light emitted from the first emission region O1 or the second emission region O2 of the emission layer 30 of the AC electroluminescence device 100. A photodiode may be used as a light receiving sensor, but the present invention is not limited thereto. For example, the photodiode may be replaced with a phototransistor, a photothyristor, a photomultiplier tube, a photodiode using photoconductivity of cadmium sulfide (CdS), a charge coupled device (CCD) image sensor, or a complementary metal-oxide semiconductor (CMOS) image sensor or may configure a light receiving sensor by being combined with any one of them. An array of the light receiving sensors may be any one of or a combination of a CCD type, a MOS type, a charge injection device (CID) type, a plasma coupled device (PDC) type, a charge priming device (CPD) type, and a bucket brigade device (BBD) type.

The processor 220 may perform fingerprint recognition by analyzing light emission detected by the light receiving sensor layer 210. For example, the processor 220 may generate an image of the pattern of a contact input contacting the dielectric layer 50 of the AC electroluminescence device 100 or a proximity input being proximate to the dielectric layer 50 of the AC electroluminescence device 100 based on a signal detected by the light receiving sensor layer 210 or display the generated image on a display (not shown). The pattern of the contact input or the proximity input may correspond to at least one character input by a fingerprint of a touch-input finger and/or a conductive pen, but is not limited thereto.

According to various embodiments, the light receiving sensor layer 210 and/or processor 220 in the fingerprint recognizing sensor platform may be replaced by separate electronic devices. For example, light transmitted through the bottom electrode 10 of the AC electroluminescence device 100A or 100B may be photographed through an image sensor of a smart phone, and a fingerprint recognition application installed on the smart phone may be used.

According to an embodiment of the present invention, an AC electroluminescence device having an inverted structure in which a dielectric layer is disposed between a top electrode and an emission layer and an electron injecting layer is disposed between a bottom electrode and the emission layer is proposed, thereby providing a highly integrated AC electroluminescence device with low manufacturing cost and a simple structure. Furthermore, by providing an optimized light emission mechanism between the bottom electrode and the emission layer, the top electrode may be formed of various conductive materials.

According to another embodiment of the present invention, as a conductive object (e.g., a finger or a stylus pen) that may be used as a proximity touching means functions as a top electrode of an AC electroluminescence device, an AC electroluminescence device 100 having a new driving principle and a driving mechanism may be provided.

Furthermore, according to another embodiment of the present invention, a fingerprint recognition sensor platform having the above-described advantages may be provided.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An AC electroluminescence device having an inverted structure comprising:
a bottom electrode including a first electrode and a second electrode apart from each other, wherein AC power is applied between the first electrode and the second electrode;
an electron injecting layer disposed on the bottom electrode;
an emission layer disposed on the electron injecting layer;
a dielectric layer disposed on the emission layer;
a top electrode disposed on the dielectric layer, the top electrode comprises a first portion opposing the first electrode and a second portion opposing the second electrode;
a first emission region defined by a first overlapping region of the emission layer between the first portion of the top electrode and the first electrode of the bottom electrode; and
a second emission region defined by a second overlapping region of the emission layer between the second portion of the top electrode and the second electrode of the bottom electrode,
wherein a light emission of the first emission region and light emission of the second emission region occur alternately.

2. The AC electroluminescence device of claim 1, wherein the top electrode electrically interconnects the first overlapping region of the first electrode and the second overlapping region of the second electrode in a structure in which the bottom electrode, the electron injecting layer, the emission layer, and the dielectric layer are stacked.

3. The AC electroluminescence device of claim 1,
wherein, during a first half-period, an electric field is formed toward the second electrode of the bottom electrode, the top electrode, and the first electrode of the bottom electrode, and
wherein, during a second half-period, an electric field is formed toward the first electrode of the bottom electrode, the top electrode, and the second electrode of the bottom electrode.

4. The AC electroluminescence device of claim 1, wherein the top electrode is a conductive external object.

5. The AC electroluminescence device of claim 1, wherein the first electrode is a transparent electrode formed of any one of indium tin oxide (ITO), indium zinc oxide (IZO), carbon nanotube (CNT)graphene, silver (Ag) nano wire, a metal mesh, and hybrid metal embedded.

6. The AC electroluminescence device of claim 1, wherein the electron injecting layer comprises at least one of materials including a composite material (ZnO:PEI) of polyethylenimine (PEI) and zinc oxide (ZnO), Alq3(tris(8-hydroxyquinoline)aluminum), Balq(Bis(2-methyl-8-quinolinolate)-4-(phenylphenolato)aluminium:Balq), Bebq2(bis (10-hydroxybenzo[h]quinolinato)-beryllium:Bebq2), BCP (2,9-dimethyl-4,7-diphenyl-1,10-phenanthroline), Bphen(4, 7-diphenyl-1,10- phenanthroline), TPBI((2,2',2''-(benzene-1,3,5-triyl)- tris(1-phenyl-1H-benzimidazole), TAZ (3-(4-biphenyl)-4-phenyl-5-tert-butylphenyl-1,2,4-triazole), NTAZ(4-(naphthalen-1-yl)-3,5-diphenyl-4H-1,2,4-triazole), NBphen(2,9-bis(naphthalen-2-yl)-4,7-diphenyl-1,10-phenanthroline), 3TPYMB(Tris(2,4,6-trimethyl-3-(pyridin-3-yl)phenyl)borane:3TPYMB), POPy2(Phenyl-dipyrenyl-phosphine oxide), BP4mPy(3,3',5,5'-tetra[(m-pyridyl)-phen-3-yl]biphenyl), TmPyPB(1,3,5-tri[(3-pyridyl)-phen-3-yl]benzene), BmPyPhB(1,3-bis[3,5-di(pyridin-3-yl)phenyl]benzene), Bepq2(Bis(10-hydroxybenzo[h]quinolinato) beryllium), DPPS(Diphenylbis(4-(pyridin-3-yl)phenyl)silane), TpPyPB(1,3,5-tri(p-pyrid-3-yl-phenyl)benzene), Bpy-OXD(1,3-bis[2-(2,2'-bipyridine-6-yl)-1,3,4-oxadiazo-5-yl]benzene), BP-OXD-Bpy(6,6'- bis[5-(biphenyl-4-yl)-1, 3,4-oxadiazo-2-yl]-2,2'-bipyridyl), tBu-PBD(2-(4-Biphenylyl)-5-(4-tert-butylphenyl)-1,3,4-oxadiazole), and ADN(9, 10-di(naphthalene-2-yl) anthrascene).

7. The AC electroluminescence device of claim 1, further comprising a hole injecting layer disposed between the emission layer and the dielectric layer.

8. The AC electroluminescence device of claim 7, wherein the hole injecting layer comprises at least one of materials including PEDOT/PSS(Poly(3,4-ethylenedioxythiophene)/Poly(4-styrenesulfonate)), a phthalocyanine compound, DNTPD(N,N'-diphenyl-N,N'-bis-[4-(phenyl-m- tolyl-amino)- phenyl]-biphenyl-4,4'-diamine), m-MTDATA (4,4',4"-tris(3-methylphenylphenylamino)triphenylamine), TDATA(4,4'4"-Tris(N,N-diphenylamino)triphenylamine), 2T-NATA(4,4', 4"-tris{N,-(2-naphthyl)-N-phenylamino}-triphenylamine), α-NPD(N,N'-bis(naphthalen-1-yl)-N,N'-bis(phenyl)-2,2'-dimethylbenzidine), PANI/DBSA (Polyaniline/Dodecylbenzenesulfonic acid), PANI/CSA(Polyaniline/Camphor sulfonicacid), PANI/PSS(Polyaniline)/Poly(4-styrenesulfonate), N,N'-di(naphthalene-1-yl)-N,N'-diphenyl-benzidine (NPB), poly(N-vinylcarbazole) (PVK), poly(4-vinyltriphenylamine) (PVTTA), poly[N-(4-{N'-[4-(4-diphenylamino)phenyl]phenyl-N'-phenylamino}phenyl) methacrylamide] (PTPDMA), and poly[N,N'-bis(4-butyl-phenyl)-N,N'-bis(phenyl)benzidine (Poly-TPD).

9. An AC electroluminescence device having an inverted structure comprising:
   a bottom electrode;
   an electron injecting layer disposed on the bottom electrode;
   an emission layer disposed on the electron injecting layer; and
   a dielectric layer disposed on the emission layer;
   wherein when a conductive external object approaching to or contacting the dielectric layer is electrically connected to the emission layer via the dielectric layer and function as a top electrode, the emission layer emits discontinuous light in every half frequency of AC power,
   wherein the bottom electrode comprises a first electrode and a second electrode apart from each other,
   wherein AC power is applied between the first electrode and the second electrode.

10. The AC electroluminescence device of claim 9, wherein, in the stacked structure, AC power is applied between the bottom electrode and the dielectric layer.

11. The AC electroluminescence device of claim 9, wherein the conductive external object is either a finger of a user or a stylus pen.

12. The AC electroluminescence device of claim 9, wherein the emission layer emits light according to the pattern of a touch input applied to the top of the dielectric layer.

* * * * *